United States Patent [19]

Ryan et al.

[11] Patent Number: 5,374,703

[45] Date of Patent: Dec. 20, 1994

[54] UREA-ISOCYANURATE COPOLYMERS

[75] Inventors: Anthony J. Ryan, Glossop; John L. Stanford, Urmston; Arthur N. Wilkinson, Stockport, all of United Kingdom

[73] Assignee: Kabushiki Kaisha Kobe Seiko Sho, Kobe, Japan

[21] Appl. No.: 90,636

[22] Filed: Jul. 13, 1993

Related U.S. Application Data

[63] Continuation of Ser. No. 773,279, Oct. 9, 1991, abandoned.

[30] Foreign Application Priority Data

Oct. 9, 1990 [GB] United Kingdom ................ 9021917

[51] Int. Cl.$^5$ .............................................. C08G 18/00
[52] U.S. Cl. ....................................... 528/44; 528/48; 528/52; 528/76
[58] Field of Search ........................ 528/44, 48, 52, 76

[56] References Cited

U.S. PATENT DOCUMENTS 4,745,137  5/1988  Thomas et al. .................... 521/137

*Primary Examiner*—John Kight, III
*Assistant Examiner*—Duc Truong
*Attorney, Agent, or Firm*—Oblon, Spivak, McClelland, Maier & Neustadt

[57] ABSTRACT

Urea-isocyanurate copolymers are obtained by the reaction of:

(a) an organic polyisocyanate compound,
(b) a polyamino compound having at least two amino groups connected by a flexible chain, and
(c) optionally an amino chain extender in which the amino groups are substantially less reactive towards the polyisocyanate (a) than are the amino groups of compound (b), the reaction being effected in the presence of
(d) a trimerisation catalyst effective to convert a polyisocyanate to a polyisocyanurate in the reaction the ratio of the number of equivalents of isocyanate groups to the total number of moles of amino groups is at least 8.7, and the ratio of the number of equivalents of chain extender (c)—if used—to the number of equivalents of polyamino compound (b) is a maximum of 5:1.

The copolymers are especially useful for producing articles by Structural Reaction Injection Moulding.

23 Claims, No Drawings

UREA-ISOCYANURATE COPOLYMERS

This application is a continuation of application Ser. No. 07/773,279, filed on Oct. 9, 1991, now abandoned.

BACKGROUND OF THE INVENTION

1. Field of the Invention

The present invention relates to the production of urea-isocyanurate copolymers which are useful particularly but not exclusively in Reaction Injection Moulding (RIM) applications and Structural Reaction Injection Moulding.

2. Discussion of the Background

Reaction Injection Moulding employs intimate mixing (usually by impingement) of at least two streams of reactive liquids followed by their injection into a mould where polymerization and fabrication occur simultaneously. A development of the RIM technique is Structural Reaction Injection Moulding (SRIM) which is used for the production of composite materials. In SRIM, a reinforcing material (usually a fibrous mat) is pre-placed in a mould so as to be incorporated in the final moulded article. The successful operation of the SRIM technique requires that the reinforcement be adequately wetted by the reactive liquids prior to gelling.

It is well known to produce polyurethane and polyurea articles by RIM. Thus for example polyurea formation may be effected by mixing a liquid stream comprising a polyisocyanate compound (e.g. an MDI derivative) and one or more other liquid streams which comprise polyamino compound having a flexible chain (usually a polyalkyleneoxy chain) connecting the amino groups, and a chain extender which is a comparatively low molecular weight aromatic diamine. Typically the chain extender is used in an amount of at least two equivalents (of chain extender) per equivalent of the polyamino compound (see for example WO-A89/06251).

However, such polyureas have the disadvantage that they have a high mould filling viscosity and a very short gel time and are unsuitable for SRIM processing.

Polyisocyanurate polymers are already known and are obtained by trimerisation of an organic polyisocyanate compound in the presence of a trimerisation catalyst (many examples of which are known) to produce a high cross-link density product which comprises of the 'interconnected' isocyanurate rings.

Solid polyisocyanurates generally suffer from brittleness resulting from the high cross link density. Attempts to overcome the brittleness problem and produce polymers which are useful in RIM applications is described in U.S. Pat. No. 4,126,741 and U.S. Pat. No. 4,126,742 which disclose the reaction of the polyisocyanate with up to a total of about 0.4 equivalents of specific polyol combinations (to provide adducts containing urethane linkages) prior to trimerisation of the remaining free isocyanate groups to form the isocyanurate networks. The resulting products are thus urethane isocyanurate copolymers. However, such products are associated with the disadvantage that they have limited stability above 100° C. due to the presence of the PU catalysts required for their preparation.

It has also been proposed in U.S. Ser. No. 247,270 to form urea isocyanurate copolymers which are useful in RIM applications. The copolymers disclosed in U.S. Ser. No. 247,270 are produced, in the RIM process, by the reaction impingement mixing of a polyalkylene oxide amino, an amino terminated chain extender, and an aromatic polyisocyanate as well as a catalyst for effecting isocyanurate formation. The preferred isocyanate index of the mixture is in the range of about 1.2–2.0. The reaction proceeds by initial 'capping' of the aminos by the excess isocyanate followed by trimerisation to form the isocyanurate network and thereby produce a urea isocyanurate copolymer. However, a disadvantage of such products is that they have mould filling viscosities which are too high for successful use in SRIM applications.

SUMMARY OF THE INVENTION

According to a first aspect of the present invention there is provided a urea-isocyanurate copolymer which has been obtained by the reaction of:

(a) an organic polyisocyanate compound, (b) a polyamino having at least two amino groups connected by a flexible chain, and (c) optionally an amino chain extender in which the amino groups are substantially less reactive towards the polyisocyanate (a) than are the amino groups of compound (b), the reaction being effected in the presence of (d) a trimerisation catalyst effective to convert a polyisocyanate to a polyisocyanurate, wherein in said reaction the ratio of the number of equivalents of isocyanate groups to the total number of moles of amino groups is at least 8.7, and the ratio of the number of equivalents of chain extender (c)—if used—to the number of equivalents of polyamine (b) is a maximum of 5:1.

According to a second aspect of the present invention there is provided a method of producing a urea-isocyanurate copolymer by reaction injection moulding comprising affecting mixing (preferably impingement mixing) of:

(a) a first stream of an organic polyisocyanate compound, (b) a polyamino compound having at least two amino groups connected by a flexible chain, (c) optionally an amino chain extender in which the amino groups are substantially less reactive towards the polyisocyanate (a) than are the amino groups of compound (b), and (d) a trimerisation catalyst effective to convert a polyisocyanate to a polyisocyanurate, and injecting the mixture into a heated mould wherein the stoichiometric ratio of the number of equivalents of isocyanate groups to the total number of equivalents of amino groups is at least 8.7, and the ratio of the number of equivalents of chain extender (c) if used—to the number of equivalents to polyamine (b) is a maximum of 5:1.

DETAILED DESCRIPTION OF THE PREFERRED EMBODIMENTS

The reference above to the compound (c) being substantially less reactive towards the polyisocyanate (a) than amino compound (b) is intended to mean that the half time for the reaction between (a) and (b) is at least 10, and preferably at least 100, times less than that between (a) and (c) (for a reaction conducted in the same solvent at the same concentrations).

The present invention has been based on our discovery that polymers with superior high temperature resistance (e.g. continuous service temperatures greater than 150° C.), low coefficient of thermal expansion, and high thermal and dimensional stability, low moisture uptake, which are useful in the production of high-modulus (e.g. >6 GPa) products may be obtained by the reaction of the components (a), (b) and optionally (c) above in the presence of a trimerisation catalyst and under such conditions that the equivalent ratio of isocyanate groups to amino groups is at least 8.7. The resulting products are highly cross-linked by virtue of isocyanurate ring formation (more details of which are given below) and also include urea functionality. The presence of this urea functionality provides the superior high temperature properties whilst the high cross link density ensures good solvent and oil resistance, low coefficient of thermal expansion, and high thermal and dimensional stability.

It may be considered as surprising that effective products may be obtained by omission of the chain extender (c) since such chain extenders are generally considered to be essential in the production of reaction injected moulded products based on polyureas. The fact that chain extenders (c) are not essential in the present invention is, we believe, due to the high cross-link density which is achieved using an equivalent ratio of isocyanate to amino of at least 8.7.

A significant advantage of the present invention relates to the production of composite materials, i.e. materials in which the urea-isocyanurate copolymer incorporates reinforcement. This reinforcement may take the form of particulate material incorporated in the reactant streams but it is much more preferred to incorporate layers of reinforcement material in the mould. Such reinforcement may, for example, take the form of sheets, mats, or the like of glass fibre, carbon fibre or Kevlar (Registered Trade Mark). The fibers in the reinforcement layers may be of a predetermined (e.g. uniaxial) orientation or may be of random orientation. It is possible to use different reinforcing layers in the mould. For example, the reinforcement may comprise outer layers of Kevlar or carbon fibre and at least one inner layer of glass fibre. Furthermore, irrespective of whether or not the inner and outerlayers are of different materials, it is preferred for the outer layers to be uniaxially or biaxially orientated and the inner layer (or layers) to be randomly orientated.

As explained below, the large excess of isocyanate used in the reactant mixture allows the viscosity thereof to be maintained comparatively low during the process of mould filling therefore allowing sufficient time for fibrous reinforcement in the mould to be thoroughly wetted before the cross-linking reaction (isocyanurate formation) takes place to any significant extent. This is obviously advantageous in terms of the bonding of the urea-isocyanurate copolymer to the reinforcement and therefore to the integrity of the composite product.

To prepare the products of the invention, a conventional reaction injection moulding apparatus may be used. The reactants will generally be supplied to a mixing head in two streams, namely a first stream which comprises the polyisocyanate compound (a); and a second stream comprising the polyamino compound (b), the optional chain extender (c), and the trimerisation catalyst.

Within the mixing head there is an almost instantaneous reaction (i.e. within milliseconds) between the amino groups of the polyamino compound (b) and the isocyanate groups of the polyisocyanate compound (a) with the formation of urea linkages. In effect, therefore, the amino groups of (b) are substantially immediately capped and do not take any further part in the reaction. This "capping" produces an increase in viscosity of the reactant mixture prior to its injection into the mould. The extent to which this viscosity rise occurs depends on the following criteria:

(i) the ratio of the amounts of (b):(a)
(ii) functionality of (b);
(iii) molecular weight of (b).

An increase in any one of (i)–(iii) will cause an increase in viscosity resulting from the initial capping reaction. Thus, it is possible selectively to control the degree of viscosity increase and this is particularly advantageous in the case where the mould contains pre-placed reinforcement (SRIM) since the use of lower viscosities ensures that such reinforcement is fully "wetted". If a chain extender (c) is present, then the next stage of the reaction is the capping of the amino groups of (c) by isocyanate groups of the polyisocyanate compound (a).

Such a reaction occurs more slowly than that between (a) and (b) and takes within a few seconds initial mixing of the reactant stream. The reaction between (a) an d (c) produces a further viscosity increase. Ideally, the mould will be substantially completely filled before the capping reaction between polyisocyanate compound (a) and chain extender (c) takes place, otherwise viscosity may increase too much for effective mould filling.

It should be noted that due to the amount of excess isocyanate compound present the increases in viscosity caused by reaction between (a) and (b) (and (c) if present) produce only a comparatively low rate of molecular weight increase and therefore low increase in viscosity.

As thus far described, the reaction has involved the capping of amino groups of (b) and possibly (c) by the polyisocyanate compound (a). Thus, in an idealized case, the reaction mixture at this stage comprises excess polyisocyanate (a) together with adducts of the amino compounds (b) and possibly (c). These adducts are also isocyanate terminated. In the next stage of the reaction, which should only commence after complete mould filling, the trimerisation catalyst is effective to effect inter- and intra- molecular conversion of free isocyanate groups into an isocyanurate ring with the result that a highly cross-linked structure is built up.

A wide variety of polyisocyanate compounds (a) may be used for the invention. The polyisocyanate will preferably have a functionality in the range 2 to 3, more preferably 2 to 2.7. The polyisocyanate is preferably aromatic. The most preferred polyisocyanate is diphenyl methane diisocyanate (MDI) and its derivatives conventionally used to obtain a liquid product (e.g. polyphenylene polymethylene polyisocyanate). The preferred derivative would be a uretonimine/carbodiimide modification of pure MDI, for example Isonate 143 L (ex DOW) or their mixtures with quasi prepolymers, e.g. Isonate RMA 400 (ex DOW).

Further aromatic polyisocyanates which may be used in the process of the invention are those exemplified in columns 3 and 4 of U.S. Pat. No. 4,487,908 and column 3 of U.S. Pat. No. 4,126,742.

Further examples of polyisocyanates which may be used are alicyclic and heterocyclic diisocyanates, e.g. furan diisocyanates.

The amount of the polyisocyanate used in the reaction is preferably such that the equivalent ratio of isocyanate to amino is in the range 4:1 to 20:1, more preferably 7:1–15:1, e.g. ca 10:1. Use of stoichiometric ratios less than 4 causes high mould filling viscosity and a very short gel time (thus rendering the materials unsuitable for SRIM processing).

The polyamino compounds (b) used in the invention include a flexible chain, i.e. one with a glass transition temperature ($T_g$) well below ambient temperature.

The preferred polyaminos (b) are high molecular weight amino-functionalized (preferably amino-terminated) polyether based materials. The polyether backbone is preferably polyalkylene oxide backbone, preferably one in which the alkylene residue has 2–4 carbon atoms. The polyether based materials used in the invention preferably have a molecular weight of 200–12000 and a functionality in the range 2–8. The preferred functionality is 2 or 3. If a polyether polyamino with a functionality of 2 is used, then preferably the polyether polyamino has a molecular weight in the range 500–10000, most preferably 2000–4000. If the polyamino has a functionality of 3, then its molecular weight is preferably in the range 400–10000, more preferably 3000–6000.

Suitable polyether polyaminos for use in the invention are the Jeffamine products available from Texaco.

Other polyaminos which may be used are based on silicones, butadienes, isobutylenes, and isoprenes as well as copolymers thereof with other monomers, e.g. a copolymer of butadiene and acrylonitrile.

The chain extender (c) is optional but if used enables control of mould filling viscosity, gel time and modulus material to be produced. The chain extender (c) is preferably an amino having at least two amino groups each bonded to a ring and preferably sterically shielded, e.g. by alkyl groups. The ring structure (s) may be aromatic, quasi-aromatic, alicyclic, or heterocyclic. The attachment of the amino groups to a ring reduces the reactivity of the amino group so that the reaction with the polyisocyanate is slower than for (b). Preferably there is a maximum of two ring systems in the chain extender molecule.

The chain extender may for example be of the general formula (I):

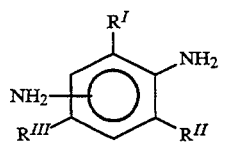

in which $R^I$, $R^{II}$, and $R^{III}$ are the same or different alkyl groups preferably having a maximum of 3 carbon atoms. The preferred chain extender of formula (I) is diethyl toluene diamine (DEDTA) which is a mixture of compounds of the formula:

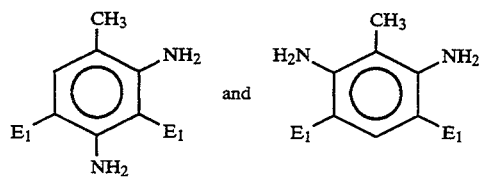

Further examples of chain extenders which may be used have two aromatic ring systems connected directly or indirectly to each other, e.g. via a methylene group.

Examples of chain extenders in this category are of formula (III) or (IV)

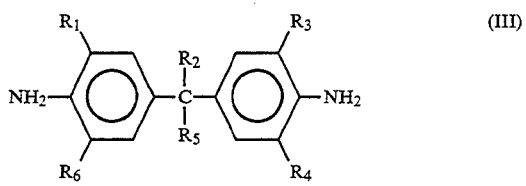

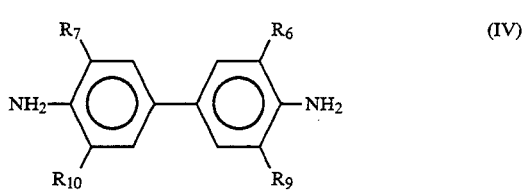

in which $R_1$–$R_{10}$ may be hydrogen, alkyl, aryl or aralkyl in any combination with the proviso that at least one of each of the pairs listed below is a group providing stearic shielding of the adjacent amino group, preferably an isopropyl group.

$R_1$ and $R_6$
$R_3$ and $R_4$
$R_7$ and $R_{10}$
$R_8$ and $R_9$

The presence of a methylene group between the two aromatic nuclei in Formula (III) provides a limited amount of flexibility in the chain extender.

The analogous cycloaliphatic derivatives (i.e. in which the aromatic nuclei are hydrogenated) may also be used.

The preferred compounds are MDIPA (methylene bis-2,6-diisopropyl aniline) $R_1$, $R_3$, $R_4$, $R_6$,=iPr; $R_2$, $R_5$=H; in structure (III), and M.MIPA (methylene bis 2-methyl-6-isopropyl aniline) $R_1$, $R_3$=iPr; $R_2$, $R_5$=H; and $R_4$, $R_6$=Me in structure (III) together with their mixtures with DEDTA.

It is of course possible to use mixtures of the compounds (I), (II), and (III) and/or (IV).

Other amino functional chemicals such as aliphatic diamines, napthalenic diamines liquid mixtures of the polyphenylene polymethylene polyaminos of the type obtained from aniline formaldehyde condensation may also be used.

The chain extender (c) when used is present in the reactant mixture in an amount not greater than five equivalents of (c), more preferably not more than 3 equivalents, more preferably not more than 1 equivalents per equivalent of polyamino (b). Use of higher amounts of (c) causes high mould filling viscosity and a very short gel time and thus the materials are unsuitable for SRIM processing.

The trimerisation catalyst is effective for converting free isocyanate groups into isocyanurate ring structures, as described above. A wide variety of such catalyst are known and may be used in the present invention. Examples of such catalysts are those listed in columns 3 and 4 of U.S. Pat. No. 4,126,742. Further examples may be used are the quaternary ammonium carboxylates as described in U.S. Pat. No. 4,040,992. A particularly preferred catalyst is N-hydroxypropyl-trimethylammonium 2-ethyl hexanoate as available under the name DABCO TMR. The amount of 2-ethyl hexanoate catalyst used is typically in the range 0.01 to 1 parts (more preferably 0.03 to 0.5 parts) per hundred parts of the polyamine (b). The greater the amount of catalyst used the shorter will be the gel time. Ideally, the amount of catalyst will be such to give a gel time of at least 5 seconds so as to allow sufficient time for complete mould filling.

The temperature of the mould should be in the range 50°–150° C. Below 50° C. there may be no or insufficient conversion of isocyanate groups to isocyanurate rings so that the high cross-link density is not built up. Above 150° C. the reactant mixture may gel too quickly.

The invention will be further described by reference to the following non-limiting Examples and also to FIG. 1 of the accompanying drawings which illustrates orientation of reinforcing mats in a mould for a SRIM process.

EXAMPLE 1

Jeffamine D-2000 (100 parts) and DABCO TMR (1.06 parts) were premixed and charged to the B side of the UMIST HP-15 reaction injection moulding machine (described in Plastics and Rubber Processing and Engineering, 13 (1990) 111–119). The A-side was charged with Isonate M143. The A-side was maintained at a temperature of 40° C. under a nitrogen atmosphere at 5 psi. The B-side was maintained at a temperature of 60° C. under a dry air atmosphere at 15 psi. The mass ratio of 2.0 A/B was maintained throughout the study and this corresponds to an equivalent ratio (defined as the equivalents of isocyanate groups divided by the moles of amino group) of 14.0. The machine throughput was 150 g s$^{-1}$ at a pressure of 2000 psi. The components were injected into a 450 mm × 150 mm × 3 mm rectangular plaque mould made from nickel coated aluminium. The mould was preheated to 115° C. and treated with Freekote 1711 spray-on mould release. Plaques were removed from the mould after 5 minutes and allowed to age at room temperature for at least one week prior to testing. Table 1 summarizes the composition and properties of the resultant polymer.

EXAMPLE 2

The experiment of example 1 repeated with the exception that DETDA was added to the D-2000/TMR mixture in the ratio 4.9 parts of DETDA to 100 parts of D-2000. The mass ratio of A/B was maintained at 2.0 and this results in an equivalent ratio of 9.5. The moulding and testing procedures were as previously described and Table 1 summarizes the composition and properties of the resultant polymer.

EXAMPLE 3

The experiment of example 1 repeated with the exception that MDIPA was added to the D-2000/TMR mixture in the ratio 16.2 parts of MDIPA to 100 parts of D-2000.

TABLE 1

| Unfilled copoly(urea-isocyanurate)s | | | | | |
|---|---|---|---|---|---|
| | Example | | | | |
| | 1 | 2 | 3 | 4 | 5 |
| Reactants | | | | | |
| M143 a (pbw) | 202 | 212 | 235 | 202 | 223 |
| D-2000 (pbw) | 100 | 100 | 100 | — | — |
| T-5000 (pbw) | — | — | — | 100 | 100 |

TABLE 1-continued

| Unfilled copoly(urea-isocyanurate)s | | | | | |
|---|---|---|---|---|---|
| | Example | | | | |
| | 1 | 2 | 3 | 4 | 5 |
| DETDA (pbw) | — | 4.9 | — | — | 10.3 |
| MDIPA (pbw) | — | — | 16.2 | — | — |
| TMR (pbw) | 1.06 | 1.06 | 1.06 | 1.06 | 1.06 |
| Properties | | | | | |
| b $\rho$ (gcm$^{-3}$) | 1.18 | 1.07 | 1.09 | 1.21 | 1.12 |
| c $\sigma_u$ (MPa) | 37 | 35 | 38 | 30 | 42 |
| d $\epsilon_u$ (%) | 3.8 | 4.0 | 5.1 | 11.6 | 15.3 |
| fE$_f$(GPa) | 1.2 | 1.0 | 1.1 | 1.0 | 1.0 |
| gR$_1$ | 2.3 | 3.0 | 3.3 | 3.3 | 3.5 |
| hR$_2$ | 2.9 | 2.8 | 2.8 | 2.7 | 2.8 |
| iTg$^S$ (°C.) | −21 | −20 | −21 | −25 | −24 |
| jTg$^H$ (°C.) | 220 | 220 | 220 | 220 | 220 | a (pbw) = parts by weight
b $\rho$ = density
c $\sigma_u$ = tensile strength
d $\epsilon_u$ = elongation to failure
e $\sigma_u$ = flexural strength
fE$_f$ = flexural modulus
gR$_1$ = the ratio of the dynamic flexural moduli at −35° C. and 65° C.
hR$_2$ = the ratio of the dynamic flexural moduli at 25° C. and 150° C.
iTg$^S$ = the soft segment glass transition temperature
jTg$^H$ = the hard segment glass transition temperature The mass ratio of A/B was maintained at 2.0 and this results in an equivalent ratio of 8.7. The moulding and testing procedures were as previously described and Table 1 summarizes the composition and properties of the resultant polymer.

EXAMPLE 4

The experiment of example 1 was repeated with the exception that D-2000 was replaced by T 5000. The mass ratio of A/B was maintained at 2.0 and this results in an equivalent ratio of 22.6. The moulding and testing procedures were as previously described and Table 1 summarizes the composition and properties of the resultant polymer.

EXAMPLE 5

The experiment of example 4 was repeated with the exception that DETDA was added to the T-5000/TMR mixture in the ratio 10.3 parts of DETDA to 100 parts of T-5000. The mass ratio of A/B was maintained at 2.0 and this results in an equivalent ratio of 9.2. The moulding testing procedures were as previously described and Table 1 summarizes the composition and properties of the resultant polymer.

EXAMPLE 6

Jeffamine D-200 (100 parts) and DABCO TMR (1.06 parts) were premixed and charged to the B-side of the UMIST HP-15 reaction injection moulding machine and the A side was charged with Isonate M143. The A-side was maintained at a temperature of 40° C. under a nitrogen atmosphere at 5 psi. The B-side was maintained at a temperature of 60° C. under a dry air atmosphere at 15 psi. The mass ratio of 2.0 A/B was maintained for all the composites formed in Examples 6 to 9 and this corresponds to an equivalent ratio of 14.0. The machine throughput was 150 g s$^{-1}$ at a pressure of 2000 psi. The components were injected into a 450 mm × 150 mm × 3 mm rectangular plaque mould containing two random glass mats available under the designation M8160 (Owens Corning) that had been cut to size. The mould was preheated to 115° C. and treated with Freekote 1711 spray-on mould release agent prior to mat placement. Plaques were removed from the mound after 5 minutes and allowed to age at room temperature for at least one week prior to testing. Table 2 summarizes the composition and properties of the resultant composite.

EXAMPLE 7

The experiment of example 6 was repeated with the exception that the mould contained a layer of four glass mats which had been cut to size, two outer unidirectional glass mats available under the name Variable UDP 2300 (Hiens Co.) which were oriented along the long dimension of the mould and two M8160 random glass mats in the core. This arrangement is shown schematically in FIG. 1. The moulding and testing procedures were as previously described and Table 2 summarizes the composition and properties of the resultant composite.

EXAMPLE 8

The experiment of example 7 was repeated with the exception that the two outer unidirectional mats were made from Aralok UDP 2175 (Heins Co.) and oriented along the long dimension of the mould as shown schematically in FIG. 1. The moulding and testing procedures were as previously described and Table 2 summarizes the composition and properties of the resultant composites.

EXAMPLE 9

The experiment of example 8 was repeated with the exception that the two outer unidirectional mats were made from Graflok UDP 2200 (Hiens Co.) and oriented along the long dimension of the mould as shown schematically in FIG. 1. The moulding and testing procedures were as previously described and Table 2 summarizes the composition and properties of the resultant composite.

TABLE 2

| | Composites | | | | |
|---|---|---|---|---|---|
| | Example | | | | |
| | 1 | 6 | 7 | 8 | 9 |
| Properties | | | | | |
| p (gcm$^{-3}$) | 1.18 | 1.33 | 1.44 | 1.36 | 1.34 |
| K $\phi_f$(%) | 0 | 11.3 | 19.3 | 19.5 | 17.1 |
| $\sigma_u$ (MPa) | 37 | 69 | 161 | 210 | 148 |
| $\epsilon_u$ (%) | 3.8 | 2.0 | 1.9 | 1.6 | 1.0 |
| $\sigma_f$ (MPa) | | 151 | 420 | 341 | 296 |
| $E_f$ (GPa) | 1.2 | 4.2 | 17.7 | 21.1 | 32.6 |
| $R_1$ | 2.3 | 1.4 | 1.2 | 1.3 | 1.0 |
| $R_2$ | 2.9 | 1.4 | 1.2 | 1.5 | 1.5 |
| $Tg^S$ (°C.) | −21 | 16 | −4 | 22 | 20 |
| $Tg^H$ (°C.) | 220 | 246 | 224 | 214 | 224 | k $\phi_f$ = fibre volume fraction

We claim:
1. A urea-isocyanurate copolymer comprising:
   (a) an organic polyisocyanate compound; and
   (b) a polyamino compound having at least two amino groups connected by a flexible chain;
   wherein said copolymer is obtained by reaction injection molding of said organic polyisocyanate compound and said polyamino compound in the presence of
   (d) a trimerisation catalyst effective to convert a polyisocyanate to a polyisocyanurate,
   wherein in said reaction, the ratio of the number of equivalents of isocyanate groups to the total number of moles of amino groups is at least 8.7.

2. The urea-isocyanurate copolymer of claim 1, further comprising an amino chain extender in which the amino groups are substantially less reactive towards the polyisocyanate (a) then are the amino groups of compound (b);
   wherein the ratio of the number of equivalents of chain extender (c) to the number of equivalents of polyamino compound (b) is a maximum of 5:1.

3. A copolymer as claimed in any one of claims 1 or 2 wherein the equivalent ratio of isocyanate groups to amino groups was in the range 8.7 to 15:1.

4. A copolymer as claimed in any one of claims 1 to 2 wherein the functionality of the polyisocyanate was in the range 2 to 3.

5. A copolymer as claimed in any one of claims 1 to 4 wherein the polyisocyanate was an aromatic polyisocyanate.

6. A copolymer as claimed in claim 5 wherein the polyisocyanate was diphenyl methane diisocyanate or a liquified derivative thereof.

7. A copolymer as claimed in any one of claims 1 to 2 wherein the amino compound (b) was a high molecular weight functionalised polyether based material.

8. A copolymer as claimed in claim 7 wherein the amino compound (b) has a polyalkylene oxide backbone.

9. A copolymer as claimed in claim 7 wherein the amino compound (b) has a molecular weight of 200 to 12000.

10. A copolymer as claimed in claim 9 wherein the amino compound (b) has a functionality in the range 2 to 8.

11. A copolymer as claimed in claim 10 wherein the amino compound (b) has a functionality of 2 and a molecular weight of 500–10000.

12. A copolymer as claimed in claim 10 wherein the amino compound (b) has a functionality of 3 and a molecular weight of 400–10000.

13. A copolymer as claimed in claim 1 wherein the chain extender was present in an amount not greater than 3 equivalents per equivalent of polyamino compound (b).

14. A copolymer as claimed in claim 13 wherein the chain extender (c) is an amino having at least two amino groups each bonded to a ring and preferably sterically shield, e.g. by alkyl groups.

15. A copolymer as claimed in claim 14 wherein the ring structure(s) are aromatic.

16. A copolymer as claimed in claim 15 wherein the chain extender is of the general formula (I):

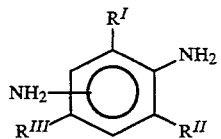

in which $R_I$, $R^{II}$, and $R^{III}$ are the same or different alkyl groups preferably having a maximum of 3 carbon atoms.

17. A copolymer as claimed in claim 16 wherein the chain extender is a mixture of compounds of the formula

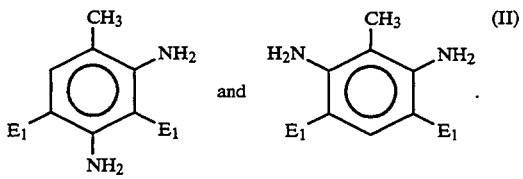

18. A copolymer as claimed in claim 14 wherein the chain extender is of formula (III) or (IV)

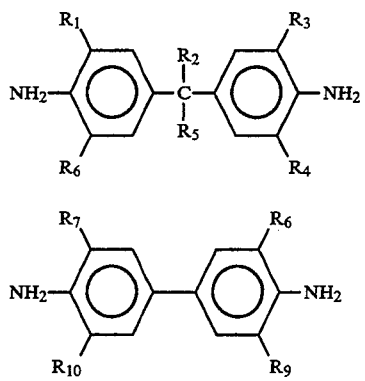

in which $R_1$-$R_{10}$ may be hydrogen, alkyl, aryl or aralkyl in any combination with the proviso that at least one of each of the pairs listed below is a group providing steric shielding of the adjacent amino group, preferably an isopropyl group;

$R_1$ and $R_6$
$R_3$ and $R_4$
$R_7$ and $R_{10}$
$R_8$ and $R_9$.

19. A copolymer as claimed in claim 18 wherein the chain extender is MDIPA or M. MIPA.

20. A copolymer as claimed in any one of claims 1 to 19 additionally comprising fibrous mat reinforcement.

21. A method of producing a urea-isocyanurate copolymer by reaction injection moulding comprising effecting mixing (preferably impingement mixing) of
 (a) a first stream of an organic polyisocyanate compound,
 (b) a polyamino compound having at least two amino groups connected by a flexible chain,
 (c) optionally an amino chain extender in which the amino groups are substantially less reactive towards the polyisocyanate (a) than are the amino groups of compound (b), and
 (d) a trimerisation catalyst effective to convert a polyisocyanate to a polyisocyanurate,
and injecting the mixture into a heated mould wherein the stoichiometric ratio of the number of equivalents of isocyanate groups to the total number of equivalents of amino groups is at least 8.7, and the ratio of the number of equivalents of chain extender (c)—if used—to the number of equivalents to polyamino compound (b) is a maximum of 5:1.

22. A method as claimed in claim 21 wherein the mould contains pre-placed reinforcement material.

23. A method as claimed in claims any one of 21 of 22 wherein the mould is at a temperature of 50°–150° C.

* * * * *